United States Patent [19]

Gagliardi et al.

[11] Patent Number: 4,675,885

[45] Date of Patent: Jun. 23, 1987

[54] DIGITAL CIRCUIT FOR EXTRACTING SYNCHRONISM SIGNALS FROM A SERIAL FLOW OF CODED DATA

[75] Inventors: Fabrizio Gagliardi; Carlo M. Bruno, both of Turin; Adler Tofanelli, Collegno, all of Italy

[73] Assignee: Sip Societa' Italiana Per L'Esercizio Telefonico P.A., Turin, Italy

[21] Appl. No.: 744,122

[22] Filed: Jun. 12, 1985

[30] Foreign Application Priority Data

Jun. 13, 1984 [IT] Italy ................................ 67606 A/84

[51] Int. Cl.⁴ .............................................. H04L 7/02
[52] U.S. Cl. .................................... 375/110; 375/118; 375/120; 307/262; 328/155
[58] Field of Search ............... 375/110, 118, 119, 120; 328/155; 307/262

[56] References Cited

U.S. PATENT DOCUMENTS 4,166,979  9/1979  Waggener ............................ 375/120
4,435,687  3/1984  Nadan et al. ......................... 375/110

*Primary Examiner*—Benedict V. Safourek
*Assistant Examiner*—M. Huseman
*Attorney, Agent, or Firm*—Karl F. Ross; Herbert Dubno

[57] ABSTRACT

The digital circuit extracts synchronism signals from a serial flow of coded data according to a process which uses a phaselocked loop where the different level transitions of the signal received are separately considered and a phase is determined for each type, the latter being compared with a specific reference phase, established in the initialization step. The error signal obtained from the comparison is used for correcting synchronism signal frequency.

20 Claims, 2 Drawing Figures

DIGITAL CIRCUIT FOR EXTRACTING SYNCHRONISM SIGNALS FROM A SERIAL FLOW OF CODED DATA

FIELD OF THE INVENTION

Our present invention relates to equipment for data transmission and, in particular, to a digital circuit extracting synchronism signals from a serial flow of coded data.

BACKGROUND OF THE INVENTION

One of the main problems in digital transmission between far (satellite earth station) or near (telephone exchange subscriber) points is transmitter and receiver synchronization.

This operation is typical of all receiving devices in order to accurately estimate the electric levels of the signal received. In fact, the knowledge of the signaling period limits, i.e. the period where a single elementary information is transmitted, makes it possible to determine the optimum sampling instant. This is the instant of minimal effects of noise and distortions introduced by the transmission channel and of maximum probability of a correct estimate of the symbol received.

This problem has been solved generally in three modes:

(a) to obtain coincidence between the signaling period of the signal received and the locally generated frequency reference signal using extremely stable generators at both transmitter and receiver. For this purpose, selected crystals, rubidium or cesium oscillators or expensive masers can be used for example.

(b) to use, as in case (a), less expensive generators and more frequent manual settings. This introduces high costs of specialized staff and in same cases difficulties because of equipment location (mountains, submarine, satellite repeaters).

(c) to use devices which automatically correct for frequent drift.

Information on the signaling period of the signal transmitted is in this case acquired by the receiver, which extracts it from data flow received, remedying both the distortion introduced by the channel and the frequency and phase differences of remote and local timing generators.

Once having obtained this information, a signal duly placed within the signaling period can be generated in order to acquire the logic level of the signal received.

Obviously, this is the least expensive and most versatile mode, as it easily adapts to different applications.

To date, a phase-locked loop, or PLL, has generally been used; it consists of a phase comparator, a filter and a controlled oscillator (for example a VCO=Voltage Controlled Oscillator).

The phase comparator determines the phase differences between the input signal and the local reference; the phase error detected is filtered so as to reduce the noise, and is sent to the controlled oscillator, which adapts the frequency of the locally generated signal accordingly.

These three components were implemented in the past with analog techniques; for example, the phase comparator can be implemented with a balanced mixer, the filter with a simple RC low-pass circuit and the VCO with a varicap (voltage controlled capacitor) which varies the resonance frequency of a tuned circuit when the voltage applied to its terminals varies.

Recently, the number of digital devices introduced into PLL's have been increased. At first, a sample-and-hold circuit was placed after the filter, so as to use a digital VCO. Then, the phase comparator and next the filter became digital, thus obtaining a fully digital PLL, that is a DPLL (digital phase locked loop).

In a DPLL implementation, the phase error is determined by estimating the lead or delay of the signal emitted by the local generator with respect to the signal emitted by the remote generator: this estimate is carried out each time and the signal received exceeds a preestablished electric threshold.

The error signal, proportional in amplitude and sign to the phase difference, is filtered and used for the necessary corrections of the local generator.

One of the main problems presented by these types of DPLL's depends on the synchronism loss in the presence of a low content of level transitions in the signal received, in particular in the case of long sequences of identical symbols. These disadvantages are overcome by the use of line coders, which increase the transition content and then the information on phase behavior.

Nevertheless, a high content of transitions implies an accurate filtering of the error estimated in order to obtain a reliable value of the signal to be used for the corrections of the local generator. This makes it possible to minimize the effects of the random variations of zero crossings (jitter). Anyway, filtering requires complex devices and algorithms, to the detriment of convergence speed and integration easiness.

OBJECTS OF THE INVENTION

It is an object of our invention to provide a digital circuit for extracting synchronism signals, which:
- effects integration with comparatively few logic gates;
- is characterized by high jitter reduction;
- has high resolution and speed in estimating the phase of the signal received;
- can be used even with inexpensive frequency references (as distinct from selected crystals or ceramic oscillators);
- requires no initial or periodic settings; and
- can be used in different applications through a suitable parameter dimensioning.

Another object is to obtain the benefits of a heavy filtering with no performance decrease.

It is a particular object of the present invention to provide a process for reliably extracting synchronism signals from a serial flow of coded data without the complexity or performance decrease of filtering.

SUMMARY OF THE INVENTION

These objects are attained in a process for extracting synchronism signals from a serial flow of coded data, where the signal corresponding to the serial flow is compared with voltage thresholds and the signal phase is compared with a reference phase, using the difference sign in order to change the frequency and the phase of the synchronism signal produced.

According to the invention the comparison with the voltage thresholds extracts the information about the instants where transitions occur and where the phase is measured, the latter being compared with a reference phase in order to obtain the difference sign; the signs are filtered and used to change the phase measurement, which then compared with an average reference phase, supplies the synchronism signals.

The initialization phase enables information to be extracted, by the comparison with the voltage thresholds, on the level and direction of each transmission, each transition is assigned to a type, then, after a preestablished number of transitions, a time averaging of the phases is carried out for each type, the average being stored for a reference phase use.

A digital circuit for extracting synchronism signals from a serial flow of coded data, which implements the process of the invention comprises:

a set of comparators, their number being one less than the electric levels of serial flow, which receives as input this flow and emits at an output a signal indicating the occurred internal threshold crossing and at another output a signal indicating the direction of threshold crossing;

a first set of flip-flops in number being equal twice that of said comparators, which stores the signals emitted by the comparators;

a first OR gate, connected to the outputs of the flip-flops which store the signals indicating the occurred crossing of comparator thresholds;

a first counter, which is enabled to count a clock signal by the signal emitted by the first OR gate and is reset by the signal emitted by a first delay cell, which resets also the set of flip-flops after the reception of the over-flow signal emitted by the first counter;

a decoder, which is enabled by the overflow signal emitted by the first counter and emits for each output, a signal identifying the type of level transition, which occurred in the serial data flow, the detection being carried out on the basis of the signals sent by the set of flip-flops;

a second counter, which counts the clock signal;

a first register, enabled by the signal sent by the first OR gate in order to store the value counted by the second counter and to transfer it at its output after the transition of the signal sent by the first delay cell;

a set of accumulators in number being equal to the number of different types of transitions to be taken into examination, which are enabled one-by-one by the signals sent by a first set of AND gates in order to accumulate the signals sent by the first register and emit the result of the accumulation after the signal sent by a set of counters;

a set of registers, which stores the results sent by the accumulators, duly divided by the number M of accumulation operations disregarding the least significant $\log_2 M$ bits, when the signal sent by a first AND gate is present, and emits them after the signals supplied by the decoder through a set of OR gates or directly;

a set of counters each counting the number of transitions of a type, which receives from the decoder through a second set of AND gates, enabled by the signals sent by a second set of flip-flops, which stores the overflow values sent by the same set of counters;

the first gate which receives the signals emitted by the second set of flip-flops;

the first set of AND gates, each receiving a signal emitted by the decoder and a signal emitted by the second set of flip-flops;

a second AND gate which receives at an input the signal emitted by the first AND gate and at the other input the same signal delayed by a second delay cell, and emits a pulse which sends to the set of OR gates, either directly or through a set of delays cells and to a third delay cell;

an adder, which is enabled by the signal emitted by the third delay cell to add the signals sent by the set of registers at successive instants;

a first subtractor, enabled by the signal emitted by the second delay cell which generates the difference between the signals emitted by one of said set of registers and the first register;

an up-down counter, which counts upward or downward according to the difference sign supplied by the first subtractor and is reset when the maximum or minimum counting value is reached, the resetting signals being used to change of one more or less unit the counting module of the second counter; and a second subtractor enabled by the signal emitted by the second delay cell which generates the difference between the signal emitted by the first subtractor, whose least significant bit is disregarded to carryout a binary division by two, and the signal emitted by the second counter, the signal emitted by the second subtractor being frequency and phase locked with the incoming data serial flow.

Advantageously the phase of the signal sent by the second subtractor is fixedly varied through a fourth delay cell.

BRIEF DESCRIPTION OF THE DRAWING

The above and other objects, features and advantages of the present invention will become more readily apparent from the following description, reference being made to the accompanying drawing.

SPECIFIC DESCRIPTION

The signal received at the end of a transmission line can present different electric levels according to the code adopted. For example, in the case of code AMI, three logic levels 1, 0 and −1 correspond to six different transition types: 1→0, 1→−1, 0→1, 0→−1, −1→0, −1→1. Observing a signalling period and establishing suitable voltage thresholds, we can note that the input signal crosses these thresholds at different instants, according to transition type.

This implies an uncertain estimate of the phase error even in the absence of frequency and phase drifts of the local generator.

Furthermore, the error introduced increases in the presence of a sequence where the different transition types do not arrive with equal probability, for example if the extractor circuit works only at limited time intervals (synchronism packets).

The circuit of the invention is based on a separate analysis of the different transition types.

For each one, the phase measured is compared with a reference phase relative to the transition under examination, thus obtaining a particular phase error for each transition. The reference phase is obtained in an initialization period where the phase of the signal at that instant is measured and stored for each transition type.

The different error types supply the signs, indicating phase lead or delay, which are organized into a serial flow and filtered through a simple time averaging.

The signal obtained is then used for correcting the local oscillator.

The drawings refer, by way of example, to a three-level line code transmitted on a balanced line.

Let us first consider the initialization phase where phase references are established for each transition type.

In our case, the signal received is symmetrical with respect to zero as a consequence of both code type and line balancing.

Then, a separate examination of only three transition types out of the six available types is sufficient. In fact, the couple of transitions $-1 \rightarrow 1$, $1 \rightarrow -1$, the couple $0 \rightarrow 1$, $0 \rightarrow -1$ and the couple $1 \rightarrow 0$, $-1 \rightarrow 0$ take place at the same instants within the signalling period.

This allows three only phase-references to be used for error evaluation.

Figure 1:
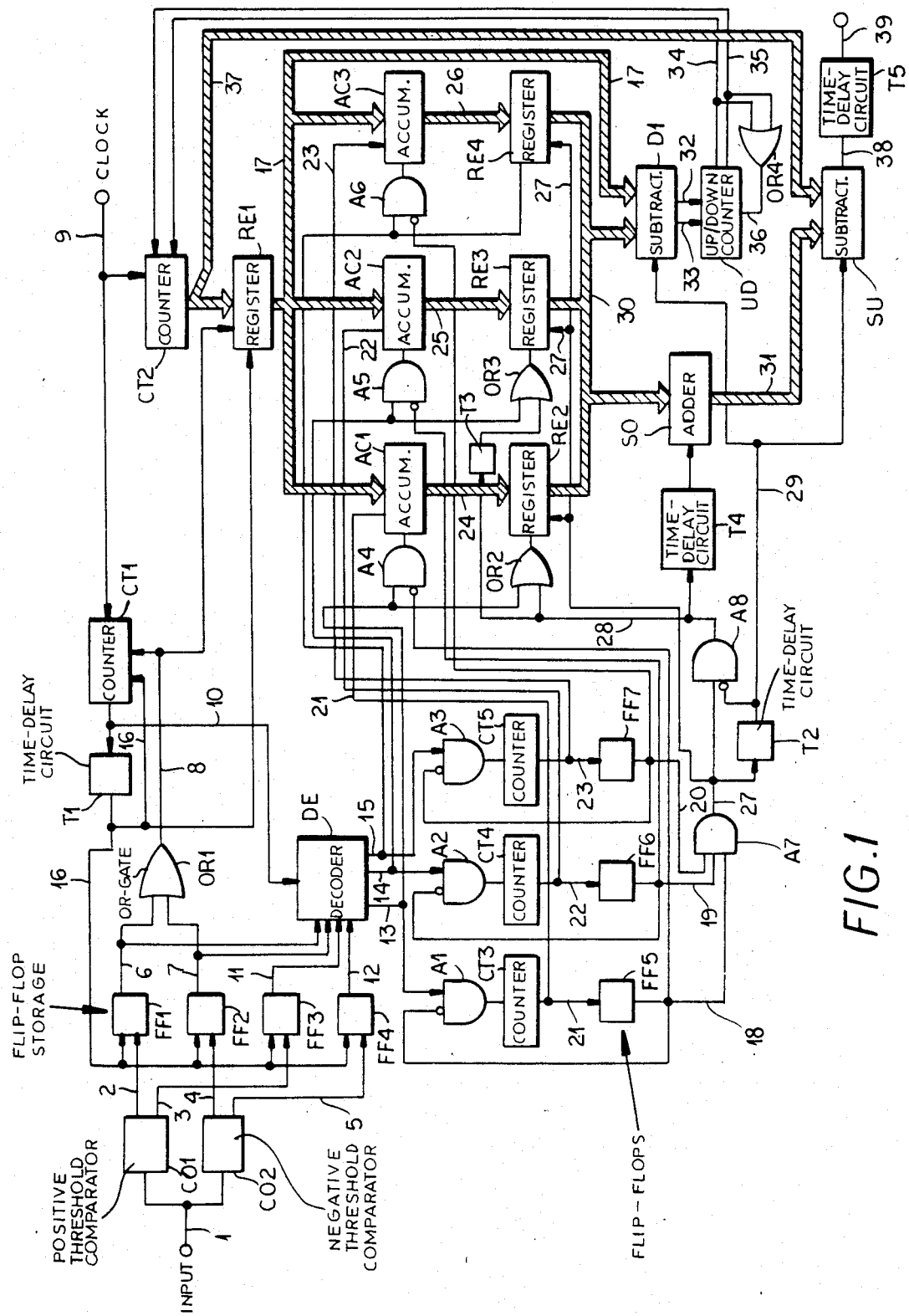
FIG. 1 is a block diagram of the circuit of the invention.

FIG. 1, the electric signal received via wire 1 is sent to a comparing means comprised of two comparators C01 and C02, which compare it with a positive and a negative voltage threshold, respectively, symmetric with respect to zero. Wires 2 and 4 deliver signals which indicate the respective threshold crossings and wires 3 and 5 deliver signals which indicate the direction of threshold crossing.

These signals are stored, a storage means comprising four flip-flops FF1, FF2, FF3 and FF4.

Once a transition occurs, wires 6 and 7 deliver an active logic level which, through gate OR1 and wire 8, enables a logic means performing the logical OR comprising counting means CT1. The latter receives the clock signal via wire 9 and counts a suitable period number so as to emit an overflow signal on wire 10 aafter a time equal to T/2, where T is the signalling period.

The overflow signal on wire 10 enables a decoding means comprising, a decoder DE, which according to logic levels on wires 6, 7, 11 or 12 emits via wire 13 a signal identifying the couple of transitions $0 \rightarrow 1$ and $0 \rightarrow -1$, via wire 14 a signal identifying the couple $1 \rightarrow 0$ and $-1 \rightarrow 0$ and via wire 15 a signal identifying the couple $1 \rightarrow -1$ and $-1 \rightarrow 1$. Signals on wire 13, 14 and 15 can never be active at the same time. The number of outputs is equal to the number of signal levels.

After this operation, the signal on wire 16 which is the representation of the signal on wire 10 delayed by delay means, cell T1, resets four flip-flops FF1, ..., FF4 and counter CT1 and allows second storage means, a register RE1, to present its contents on connection 17. At this instant, RE1 presents the value reached by counting means in the form of counter CT2, when the signal on wire 8 has become active, in correspondence with the first transition.

Counter CT2 also receives via wire 9 the clock signal having a frequency equal to N times the bit frequency of the signal received, then $2\pi T/N$ is equal to the phase evaluation accuracy. For example, N can be established to be equal to 32 or 64.

Let us go back to the signals supplied by decoder DE and assume that the signal on wire 13 is active.

At the beginning of the extraction operation, the third storage means comprising three flip-flops FF5, FF6 and FF7 have their outputs, connected to wires 18, 19, 20, at logic zero. Then, AND gates A1, ..., A6 are enabled.

An accumulating means comprises AC1, AC2 and AC3.

AND gates A1, A2, and A3 form a third logic means.

AND gates A4, A5, and A6 form a second logic means.

AND gate A7 form a fourth logic means.

Third counting means comprises counters CT3, CT4 and CT5.

The signal on wire 13 can then reach both a counter CT3 and an accumulator AC1.

Counter CT3 counts the number of transitions of type $0 \rightarrow 1$, $0 \rightarrow -1$ and, analogously, counters CT4 and CT5 count the transtions of different type revealed by the presence of signals on wires 14 ad 15.

The contents of register RE1, present on outgoing connection 17, are stored in AC1, the signal on wire 13 and the signal at A4 output being active.

At the first transition, the contents of register RE1 are transferred to AC1 and added to zero, at the next transitions the new values of RE1 are added to previous contents.

After some transitions, one of the three counters CT3, CT4, CT5 reaches the overflow value, due to M transitions of the same type, making active one of the outputs, denoted by 21, 22 and 23, respectively. The related signal is stored in one of the flip-flops FF5, FF6 and FF7.

Let us assume that the first active signal is present on wire 21, then the contents of accumulator AC1 are sent to connection 24 and stored in a register RE2. The least significant bits of the above contents, in a number equal to $\log_2 M$, are not stored in RE2, in order to carry out a binary division by M of the contents of accumulator AC1. Thus, the phase references of each type of transition are averaged before their storage means in registers RE2, RE3, RE4. The value of M should be a right compromise between the evaluation accuracy of phase reference and the duration of the initialization phase. The number of registers are equal to the number of signal levels.

The signal on wire 21, stored in FF5 and present on wire 18, inhibits AND gates A1 and A4, preventing other transitions of this type from increasing CT3 and changing the contents of register RE2.

As soon as M transitions of each type are detected, the signals present on wires 18, 19 and 20 result to be active and then also the signal on wire 27, at the output of AND gate A7.

This signal switches in reading mode registers RE2, RE3, RE4, whose contents can no more be changed.

Delay means T2 and sixth logic means, AND gate A8, are used to generate on wire 28 a pulse following a level change on wire 27. Gates OR2, OR3 and wire 15 form the fifth logic means. This pulse commands register RE2 through gate OR2 and, after a time interval established by cell T3, commands through OR3 the register RE3, so that its contents are available on connection 30 at successive instants. The pulse on wire 28, delayed by delay means T4 of a time interval shorter than that introduced by T3, commands an adding means SO so that it adds the contents of both RE2 and RE3. The result of the addition carried out in SO is taken from connection 31, disregarding the least significant bit in order to carry out a binary division by two.

The value obtained constitutes a reference to establish the optimum sampling instant within the signaling period. In fact, RE2 stores the average reference of the phase of transitions $1 \rightarrow 0$ and $-1 \rightarrow 0$; these contents have been in their turn added to each other to establish the optimum sampling instant.

Now, the initialization phase is over; next transitions can be used by extractor circuit to correct possible frequency and phase drifts of local generator.

At the first successive transition, the contents of counter CT2 are transferred to register RE1 and after a time equal to T/2 (T is the signaling period), decoder DE supplies to its outputs 13, 14 and 15 the information on the type of transition occurred. The output with active signal enables through OR2, OR3 or directly one of the three registers RE2, RE3, RE4 containing the average phase reference for that type of transition. This is made available on connection 30.

At the same time, connection 17 presents the new value measured of the phase, as for the initialization phase. Subtracting means DI, permanently enabled at the end of the initialization phase by the signal on wire 29, carries out the difference between the signals on connections 30 and 17. This difference is proportional to the possible errors of frequency and phase between remote and local generators. In particular, if the difference is positive, a signal on wire 32 increases an up-down counting means UD, while, in the negative, an analogous signal on wire 33 decreases UD.

Counter UD is to filter the phase error supplied by DI. In fact, UD supplies a pulse via wire 34 only under overflow conditions, i.e. only when a certain number of errors of the same sign has been counted. According to the accuracy of the generators to by synchronized, the module of up-down counter UD can be dimensioned so as to obtain a good compromise between the optimal filtering and the speed in tracking phase variations. Then, this module depends on both the transition percentage of the signal received and the accuracy of the two generators.

Wires 35, as wire 34, presents an active signal when the maximum negative value counted exceed UD capacity. In both cases, the signal supplied by gate OR4 via wire 36 resets counter UD. Furthermore, the pulses on wires 34 and 35 increase or decrease of one unit the module of counter CT2.

Figure 2:
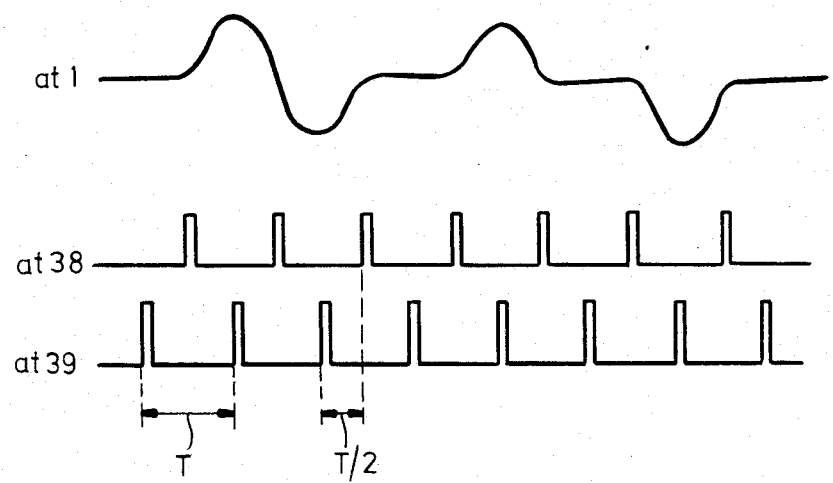
FIG. 2 is a signal timing diagram.

The value counted by CT2, present on connection 37, is compared with the phase reference present on connection 31 at each pulse supplied by the time base via wire 9. The comparison is carried out in second subtracting means SU. When the difference is null, wire 38 presents a pulse as shown in FIG. 2, which is always phase and frequency-locked to the signal received, because the value counted by CT2 was duly corrected by the signals on wires 34 and 35. The pulse on wire 38, as shown in FIG. 2 delayed of T/2 by a delay cell T5, canbe used for sampling at the optimum instant the data signal received.

Modifications and variations may be introduced without going out from the scope of the invention, the description being given by way of example and not in a limiting sense.

For example, if a three-level AMI code is not used, the circuit should be duly modified as regards the number of input comparators and the threshold values used for the comparisons. Furthermore, the number of the other blocks has to be changed, too.

In general, the number of comparators can be equal to the number of levels less one, so as to distinguish all transitions, and the number of flip-flops FF1 . . . FF4 can be equal to the double of the comparator number.

The number of counters CT3 . . . CT5, flip-flops FF5 . . . FF7, accumulators AC1 . . . AC3 and registers RE2 . . . RE4 can be equal to the number of transitions to be distinguished, taking into account possible symmetries.

We claim:

1. A process for extracting synchronism signals from a serial flow of coded data comprising the steps of:
    comparing an input signal of said serial flow with at least one voltage threshold for determining instants where transitions occur;
    assigning each of said transitions one of a plurality of transition categories;
    time averaging the phase of said input signal for each of said transition categories during an initialization phase forming an average phase signal for each of said transition categories;
    storing said average phase signal, forming stored signals for each of said transition categories;
    adding said stored signals for each of said transition categories forming a reference phase;
    comparing said phase of said input signal with said stored signals forming a difference signal;
    filtering said difference signal forming a filtered difference signal;
    correcting said phase of said input signal with said filtered difference signal forming a corrected phase signal;
    comparing said corrected phase signal with said reference phase forming a synchronism signal; and
    recovering said synchronism signal.

2. A digital circuit as defined in claim 1 wherein said fourth storage means comprise at least two registers.

3. A digital circuit is defined in claim 2 wherein the number of registers of said fourth storage means, are each equal to the number of transitions to be distinguished, taking into account possible symmetries.

4. A digital circuit for extracting synchronism signals from a serial flow of coded data comprising:
    at least two comparing means coupled to an input of said coded data each of said comparing means generates a first output indicating an occurred internal threshold crossing and a second output indicating direction of said threshold crossing;
    first storage means, coupled to said first and second outputs of said comparing means for storing said first and second outputs;
    first logic means coupled to output of said storing means for performing a logical OR on said first outputs, indicating said occurred internal threshold crossing;
    first counting means coupled to output of said first logic means for counting output of said first logic means;
    first delay means coupled to said first counting means and said first storage means for resetting said first counting means and said first storage means upon overflow of said first counting means;
    decoding means coupled to said first storage means comprising at least two decoder outputs, said decoder outputs identify the type of level transition levels, which occurred in said serial flow;
    timing means for generating a clock signal;
    second counting means coupled to said clock signal for counting said clock signal;
    second storage means coupled to said first logic means, said first delay means and said second counting means for storing value counted by said second counting means and for transferring said value after transition of output of said delay means, wherein said second storage means is enabled by said first logic means;

second logic means coupled to said decoding means for performing a logical AND operation;

third counting means coupled to said second logic means for counting number of said type of transition levels;

third storage means coupled to said second logic means and said third counting means for enabling said second logic means and for storing overflow values from output of third counting means;

accumulating means coupled to said second storage means for accumulating outputs of said second storage means;

third logic means coupled to said third storage means, said decoding means and said accumulating means for enabling one-by-one said accumulating means;

fourth logic means coupled to said third storage means for performing a logical AND operating;

fourth storage means coupled to said accumulators and said fourth logic means which stores the results sent by said accumulating means, divided by the number M of accumulation operations disregarding the least significant $\log_2 M$ bits when enabled by said fourth logic means;

fifth logic means coupled to said decoding means and said fourth storage means for enabling said fourth storage means to emit output signals;

second delay means coupled to said fourth logic means for delaying output of said fourth logic means;

sixth logic means, coupled to said fourth logic means, said fifth logic means and said second delay means for generating a pulse following a level change at the output of said fourth logic means;

third delay means coupled to said sixth logic means for delaying the output of said sixth logic means;

adding means coupled to said third delay means and said fourth storage means, which is enabled by said third delay means to add output of said fourth storage means;

first subtracting means coupled to said second delay means, said fourth storage means and said second storage means, enabled by said second delay means, for calculating the difference between the outputs of said fourth storage means and said second storage means;

up-down counting means coupled to said second counting means and said first subtracting means for counting upward or downward according to the difference sign of output of said subtracting means and said up-down counting means is reset when maximum or minimum counting value is reached forming resetting signals, wherein said resetting signal increment or decrement and said second counting means; and second subtracting means coupled to said adding means, said second delay means and said second counting means for calculating a difference between the outputs of said adding means and said second counting means, the output of said second subtracting means being frequency and phase locked with said serial flow of coded data.

5. A digital circuit as defined in claim 4 wherein the number of comparing means equals one less than electrical levels of said serial flow.

6. A digital circuit as defined in claim 5 wherein the first storage means comprises at least two flip flops.

7. A digital circuit as defined in claim 6 wherein the number of said flip flops are equal to twice the number of said comparing means.

8. A digital circuit as defined in claim 4 wherein the number of said decoder outputs equals said electrical levels of said serial flow.

9. A digital circuit as defined in claim 4 wherein frequency of said clock signal is equal to N times the bit frequency of said serial flow.

10. A digital circuit as defined in claim 9 wherein N is equal to 32.

11. A digital circuit as defined in claim 9 wherein N is equal to 64.

12. A digital circuit as defined in claim 4 wherein the phase of output of said second subtracting means is varied through a fourth delay cell.

13. A digital circuit as defined in claim 4 wherein said third storage means comprise at least two flip flops.

14. A digital circuit as defined in claim 13 wherein the number of flip flops of said third storage means, is equal to the number of transitions to be distinguished, taking into account possible symmetries.

15. A digital circuit as defined in claim 4 wherein said third counting means comprise at least two counters.

16. A digital circuit as defined in claim 15 wherein the number of counters of said thrid counting means, is equal to the number of transitions to be distinguished, taking into account possible symmetries.

17. A digital circuit as defined in claim 4 wherein said third logic means comprises at least two AND gates.

18. A digital circuit as defined in claim 17 wherein the number of AND gates of said third logic means, is equal to the number of transitions to be distinguished, taking into account possible symmetries.

19. A digital circuit as defined in claim 4 wherein said accumulating means comprises at least two accumulators.

20. A digital circuit as defined in claim 19 wherein the number of accumulators of said accumulating means is equal to the number of transitions to be distinguished, taking into account possible symmetries.

* * * * *